US007541762B2

(12) United States Patent
Chen et al.

(10) Patent No.: US 7,541,762 B2
(45) Date of Patent: Jun. 2, 2009

(54) CONTROL CIRCUIT FOR A FAN

(75) Inventors: Xiao-Zhu Chen, Shenzhen (CN); Ke Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 121 days.

(21) Appl. No.: 11/611,158

(22) Filed: Dec. 15, 2006

(65) Prior Publication Data

US 2008/0095521 A1 Apr. 24, 2008

(30) Foreign Application Priority Data

Oct. 18, 2006 (CN) ........................ 2006 1 0063176

(51) Int. Cl.
*H02K 17/32* (2006.01)

(52) U.S. Cl. ........................ 318/434; 318/471; 318/783

(58) Field of Classification Search ................. 318/434, 318/471, 783, 788, 811; 388/829
See application file for complete search history.

(56) References Cited

U.S. PATENT DOCUMENTS

2001/0024615 A1 9/2001 Chen
2003/0126473 A1* 7/2003 Maciorowski et al. ...... 713/300
2005/0035732 A1* 2/2005 Horng et al. ................ 318/434

FOREIGN PATENT DOCUMENTS

CN 2731151 Y 10/2005

* cited by examiner

*Primary Examiner*—Karen Masih
(74) *Attorney, Agent, or Firm*—Wei Te Chung

(57) ABSTRACT

A control circuit for controlling rotational speed of a fan for an electronic device includes a temperature detecting unit for detecting an ambient temperature of the electronic device, and outputting a corresponding detection result; a control unit receiving the detection result from the temperature detecting unit, and outputting a corresponding control signal; and an operational unit receiving one or both of the control signal from the control unit and a pulse-width modulation (PWM) signal, and outputting a backup control signal for controlling the rotational speed of the fan, so that the fan can continue operating when needed, even if the PWM signal disappears.

14 Claims, 1 Drawing Sheet

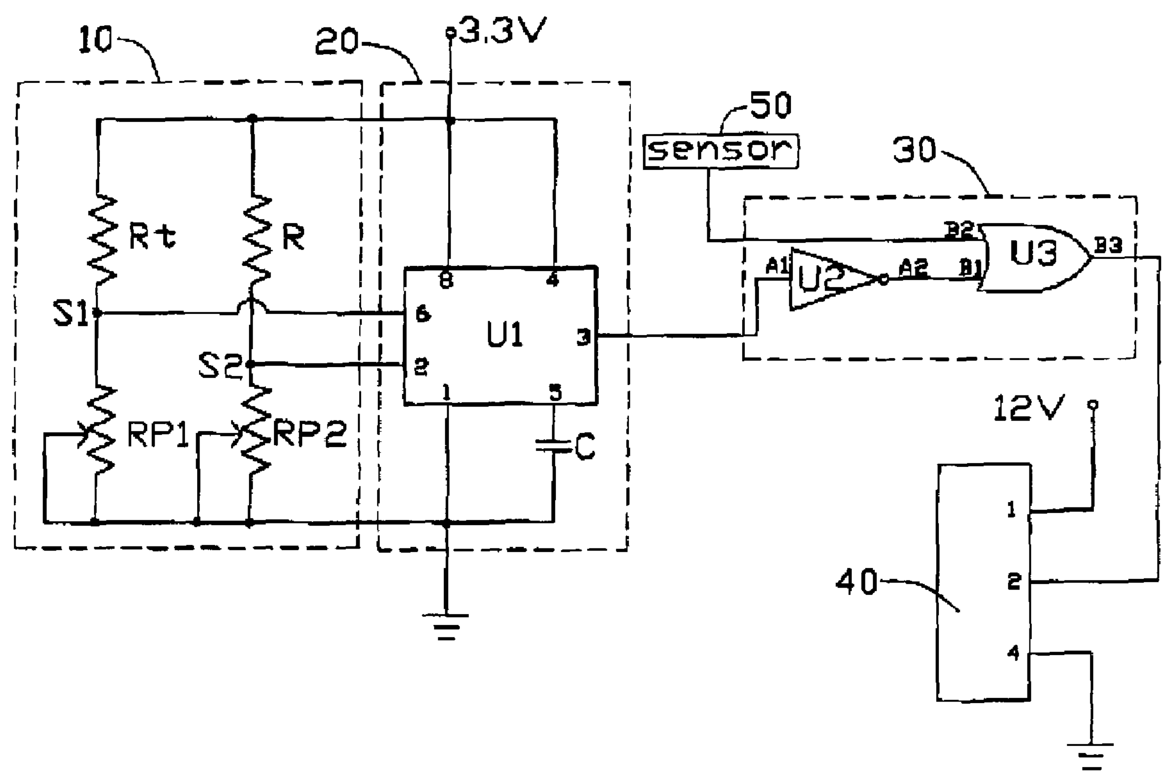
10
20
3.3V
Rt
R
S1
S2
RP1
RP2
U1
8
4
6
2
3
1
5
C
50
sensor
30
A1
U2
A2
B1
B2
U3
B3
12V
40
1
2
4

CONTROL CIRCUIT FOR A FAN

BACKGROUND OF THE INVENTION

1. Field of the Invention

The present invention relates to a control circuit, and particularly to a control circuit for providing a backup control for controlling rotational speed of a fan.

2. Description of Related Art

Generally, a computer system includes a motherboard with various chips such as a central processing unit (CPU) mounted thereon, a storage device such as a hard disc, and input/output devices, each of which is known to generate heat when operated in a computer system. Especially, the CPU produces a large amount of heat. Developments in today's information-intensive society have led to remarkable improvements in performances of electronic devices. If the heat generated from the CPU is not dissipated in a timely fashion, it may damage the CPU or even the computer system.

Typically, a sensor is programmed to be used as a temperature detector for detecting temperature of the CPU. A cooling fan is used to facilitate removal of heat to keep the temperature of the CPU within a safe temperature range. The sensor sends a pulse-width modulation (PWM) signal to the cooling fan to adjust fan speed to be more energy efficient while still providing enough heat dissipation. However, the fan will stop operating if the sensor fails, and the CPU may be damaged if the heat is not dissipated properly.

What is desired, therefore, is a control circuit for automatically providing backup control for controlling rotational speed of a fan.

SUMMARY OF THE INVENTION

In one preferred embodiment, a control circuit for controlling rotational speed of a fan for an electronic device includes a temperature detecting unit for detecting an ambient temperature of the electronic device, and outputting a corresponding detection result; a control unit receiving the detection result from the temperature detecting unit, and outputting a corresponding control signal; and an operational unit receiving one or both of the control signal from the control unit and a pulse-width modulation (PWM) signal, and outputting a backup control signal for controlling the rotational speed of the fan, so that the fan can continue operating when needed, even if the PWM signal disappears.

Other advantages and novel features will become more apparent from the following detailed description of preferred embodiments when taken in conjunction with the accompanying drawing, in which:

BRIEF DESCRIPTION OF THE DRAWING

The drawing is a circuit diagram of a control circuit for a fan in accordance with a preferred embodiment of the present invention.

DETAILED DESCRIPTION OF THE INVENTION

Referring to the drawing, a control circuit for a fan in accordance with a preferred embodiment of the present invention includes a temperature detecting unit 10, a control unit 20, and an operational unit 30. The temperature detecting unit 10 detects an ambient temperature of an electronic device such as a CPU, and outputs a corresponding detection result to the control unit 20. The control unit 20 outputs a corresponding control signal to the operational unit 30 according to the detection result. The operational unit 30 receives one or both of the control signal from the control unit and a pulse-width modulation (PWM) signal, and outputs a backup control signal to a fan connector 40 to provide a backup control of the rotational speed of the fan that is normally controlled by the PWM signal.

The temperature detecting unit 10 includes a negative temperature coefficient thermal resistor Rt, a first adjustable resistor RP1, a divider resistor R, and a second adjustable resistor RP2. The thermal resistor Rt in series with the first adjustable resistor RP1 is connected between a first power source and ground. The divider resistor R in series with the second adjustable resistor RP2 is also connected between the first power source and ground. A node S1 between the thermal resistor Rt and the first adjustable resistor RP1 provides the detection result. A node S2 between the divider resistor R and the second adjustable resistor RP2 provides a low level signal. A voltage provided by the first power source is 3.3V. The resistance of the thermal resistor Rt is sharply reduced when the ambient temperature increases.

The control unit 20 includes a timer U1, and a filter capacitor C. In the preferred embodiment of the present invention, the timer U1 is a 555 timer. An earth pin 1 of the timer U1 is grounded. A low-level trigger pin 2 of the timer U1 is connected to the node S2 to receive the low level signal. A reset pin 4, and a power pin 8 of the timer U1 are connected to the first power source. A voltage control pin 5 is grounded via the filter capacitor C. A high-level trigger pin 6 is coupled to the node S1 to receive the detection result. An output pin 3 of the timer U1 outputs the control signal.

In the preferred embodiment of the present invention, the operational unit 30 includes a NOT gate U2, and an OR gate circuit U3. An input pin A1 of the NOT gate U2 is connected to the output pin 3 of the timer U1 to receive the control signal. An output pin A2 of the NOT gate U2 is coupled to a first input pin B1 of the OR gate circuit U3. A second input pin B2 of the OR gate circuit U3 receives the PWM signal. The PWM signal comes from a sensor 50. The PWM signal controls the rotational speed of the fan when the sensor 50 works normally. An output pin B3 of the OR gate circuit U3 is the output terminal of The operational unit 30. The output pin B3 of the OR gate circuit U3 outputs the corresponding backup control signal. If the first input pin B1 and/or the second input pin B2 of the OR gate circuit U3 is high, the output pin B3 of the OR gate circuit U3 is high. The output pin B3 of the OR gate circuit U3 is low only when both the first and second input pins B1 and B2 are low.

A power pin 1 of the fan connector 40 is connected to a second power source. A voltage provided by the second power source is 12V. The second power source provides a working voltage for the fan. A speed control pin 2 of the fan connector 40 is coupled to the output pin B3 of the OR gate circuit U3 to receive the corresponding backup control signal. An earth Pin 4 of the fan connector 40 is grounded.

When the sensor works normally, the PWM signal is controlled by programs of the sensor 50 to output high or low level signals. The output pin 3 of the timer U1 is high at first, and a low level signal is sent to the first input pin B1 of the OR gate circuit U3 via the NOT gate U2. Therefore, a resulting PWM signal from the output pin B3 of the OR gate circuit U3 is the same as the PWM signal from the sensor 50, to control the rotational speed of the fan. If the sensor 50 fails to work, and the fan does not receive the PWM signal, and momentarily ceases to operate. If the ambient temperature increases as a result, the resistance of the thermal resistor Rt will sharply reduce, and the voltage of the high-level trigger pin 6 of the timer U1 will increase. When the voltage reaches a trigger point of the high-level trigger pin 6, the output pin 3 of the timer U1 outputs a low signal to the input pin A1 of the NOT gate U2. The first input pin B1 of the OR gate circuit U3 receives a high signal from the output pin A2 of the NOT gate U2. Therefore, the output pin B3 of the OR gate circuit U3 outputs a high level signal to the fan connector 40 for controlling the fan to operate once again.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A control circuit for a fan comprising:

a temperature detecting unit for detecting an ambient temperature of an electronic device, and outputting a corresponding detection result;

a control unit receiving the detection result from the temperature detecting unit, and outputting a corresponding control signal; and an operational unit receiving one or both of the control signal from the control unit and a pulse-width modulation (PWM) signal from a sensor, and outputting a backup control signal for controlling the rotational speed of the fan, so that the fan keeps operating even if the PWM signal disappears, wherein the PWM signal controls the rotational speed of the fan when the sensor works normally.

2. The control circuit as claimed in claim 1, wherein the temperature detecting unit comprises a thermal resistor, a first resistor, a divider resistor, and a second resistor; the thermal resistor in series with the first resistor is connected between a first power source and ground; the divider resistor in series with the second resistor is also connected between the first power source and ground, a node between the thermal resistor and the first resistor provides the detection result, a node between the divider resistor and the second resistor provides a low level signal.

3. The control circuit as claimed in claim 2 wherein the thermal resistor is a negative temperature coefficient thermal resistor.

4. The control circuit as claimed in claim 2, wherein the control unit comprises a timer; an earth pin of the timer is grounded, a low-level trigger pin of the timer is connected to the node between the divider resistor and the second resistor, a reset pin and a power pin of the timer are connected to the first power source, a voltage control pin is grounded, a high-level trigger pin is coupled to the node between the thermal resistor and the first resistor, an output pin of the timer outputs the control signal.

5. The control circuit as claimed in claim 4, wherein the control unit further comprises a filter capacitor, the voltage control pin is grounded via the filter capacitor.

6. The control circuit as claimed in claim 4, wherein the operational unit comprises a NOT gate and an OR gate circuit, an input pin of the NOT gate is connected to the output pin of the timer, an output pin of the NOT gate is coupled to a first input pin of the OR gate circuit, a second input pin of the OR gate circuit receives the PWM signal, an output pin of the OR gate circuit outputs the backup control signal.

7. The control circuit as claimed in claim 6, further comprising a fan connector for electrically connecting to the fan, wherein a power pin of the fan connector is connected to a second power source, a speed control pin of the fan connector is coupled to the output pin of the OR gate circuit to receive the backup control signal, an earth pin of the fan connector is grounded.

8. A control circuit for controlling rotational speed of a fan for an electronic device, the control circuit comprising:

a temperature detecting unit for detecting an ambient temperature of the electronic device, the temperature detecting unit outputting a corresponding detection result;

a control unit comprising a timer, the control unit receiving the detection result from the temperature detecting unit, and outputting a corresponding control signal; and an operational unit comprising a NOT gate and an OR gate circuit, the operational unit receiving one or both of the control signal from the control unit and a pulse-width modulation (PWM) signal from a sensor, and outputting a backup control signal for controlling the rotational speed of the fan.

wherein the PWM signal controls the rotational speed of the fan when the sensor works normally.

9. The control circuit as claimed in claim 8, wherein the temperature detecting unit comprises a thermal resistor, a first resistor, a divider resistor, and a second resistor; the thermal resistor in series with the first resistor is connected between a first power source and ground; the divider resistor in series with the second resistor is also connected between the first power source and ground, a node between the thermal resistor and the first resistor provides the detection result, a node between the divider resistor and the second resistor provides a low level signal.

10. The control circuit as claimed in claim 9, wherein the control unit further comprises a filter capacitor, an earth pin of the timer is grounded, a low-level trigger pin of the timer is connected to the node between the divider resistor and the second resistor, a reset pin and a power pin of the timer are connected to the first power source, a voltage control pin is grounded via the filter capacitor, a high-level trigger pin is coupled to the node between the thermal resistor and the first resistor, an output pin of the timer outputs the control signal.

11. The control circuit as claimed in claim 10, wherein an input pin of the NOT gate is connected to the output pin of the timer to receive the control signal, an output pin of the NOT gate is coupled to a first input pin of the OR gate circuit, a second input pin of the OR gate circuit receives the PWM signal, an output pin of the OR gate circuit outputs the backup control signal.

12. The control circuit as claimed in claim 11, further comprising a fan connector for electrically being connected to the fan, wherein a power pin of the fan connector is connected to a second power source, a speed control pin of the fan connector is coupled to the output pin of the OR gate circuit to receive the backup control signal, an earth pin of the fan connector is grounded.

13. A control circuit for controlling rotational speed of a fan for an electronic device, the control circuit comprising:

a temperature detecting unit configured for detecting an ambient temperature of the electronic device and outputting a corresponding detection result;

a control unit configured for receiving the detection result from the temperature detecting unit, and outputting a corresponding control signal; and an operational unit configured for receiving the control signal from the control unit and a pulse-width modulation (PWM) signal from a sensor via an OR gate circuit, and outputting a backup control signal generated by the OR gate circuit to a connector of the fan for controlling the rotational speed of the fan, wherein the PWM signal controls the rotational speed of the fan when the sensor works normally, when the ambient temperature of the electronic device is not higher than a predetermined value the backup control signal is determined by the PWM signal; and when the ambient temperature of the electronic device is higher than the predetermined value the backup control signal is determined by the PWM signal cooperating with the control signal from the control unit.

14. The control circuit as claimed in claim 13, wherein the operational unit further comprises a NOT gate, and the control signal from the control unit passes through the NOT gate before being received by the OR gate circuit.

* * * * *